J. Ball,

Plow Clevis.

No. 87,458.  Patented Mar. 2, 1869.

Witnesses:

Inventor:
John Ball.
Alexander & Mason
Attorney

JOHN BALL, OF CANTON, OHIO.

Letters Patent No. 87,458, dated March 2, 1869.

IMPROVEMENT IN SPRING-LINK FOR PLOW-CLEVIS.

The Schedule referred to in these Letters Patent and making part of the same.

*To all whom it may concern:*

Be it known that I, JOHN BALL, of Canton, in the county of Stark, and in the State of Ohio, have invented certain new and useful Improvements in Spring-Link for Plow-Clevis; and do hereby declare that the following is a full, clear, and exact description thereof, reference being had to the accompanying drawings, and to the letters of reference marked thereon.

The nature of my invention consists in the construction of a spring-link, to be attached to plows, in place of an open ring, or to single-trees, in fastening them to the double-trees, or any place where the common open ring is used.

In order to enable others skilled in the art to which my invention appertains, to make and use the same, I will now proceed to describe its construction and operation, referring to the annexed drawings, which form a part of this specification; and in which both figures are perspective views of my link, as intended to be made.

A represents a steel spring, made nearly of a V-shape, upside down, the lower ends of which are drawn out from opposite sides, leaving the inner edges work evenly together. These lower ends drawn out, are then bent inward, in a circular form, which leaves the spring to come naturally together.

The ends are provided with an eye, B, or hook C, to suit.

One end is secured to the clip in the double-tree, and the other to the clip in the single-tree.

By this very simple arrangement, I have a complete spring made at very little more expense than the open link, which article it is designed to supersede. I therefore call it a "spring-link." It is more especially intended to be used on plows, the one hook to fasten to the clevis, the other, to the double-tree.

Figure 1:
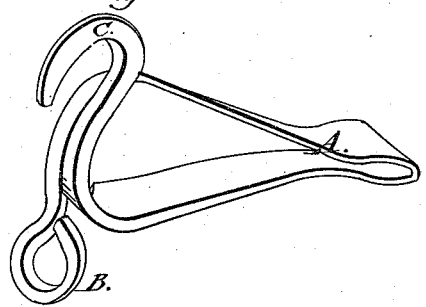
Figure 2:
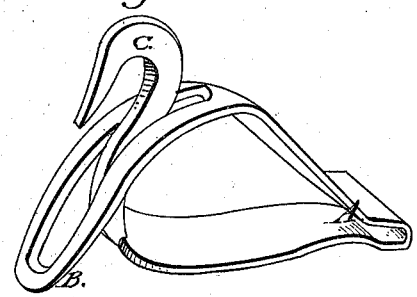

It is immaterial whether the two ends of the spring run side by side, as shown in fig. 1, or if one end is drawn out from each side to the centre, forming a hook or eye on the same, and the other end drawn out on one side and brought around and welded to the spring, forming a link through which the hook is passed, as shown in fig. 2. I prefer, however, the first mode, as I consider that the best and cheapest.

The general utility of this invention is seen at once, being a natural spring, and easily and cheaply made, and when attached to a plow will prevent breakage, by springing at the very time the plow would strike any obstruction. This link, also, for the same reason and in the same way, saves jamming the horses' shoulders, &c.

Having thus fully described my invention,

What I claim as new, and desire to secure by Letters Patent, is—

A spring-link for plow-clevis, formed of one piece of metal, in the form substantially as shown, with a hook at one end and an eye at the other, substantially for the purposes specified.

In testimony that I claim the foregoing, I have hereunto set my hand, this 5th day of December, 1868.

JOHN BALL.

Witnesses:
    J. J. CLARK,
    J. A. McHENRY.